Figure 1:
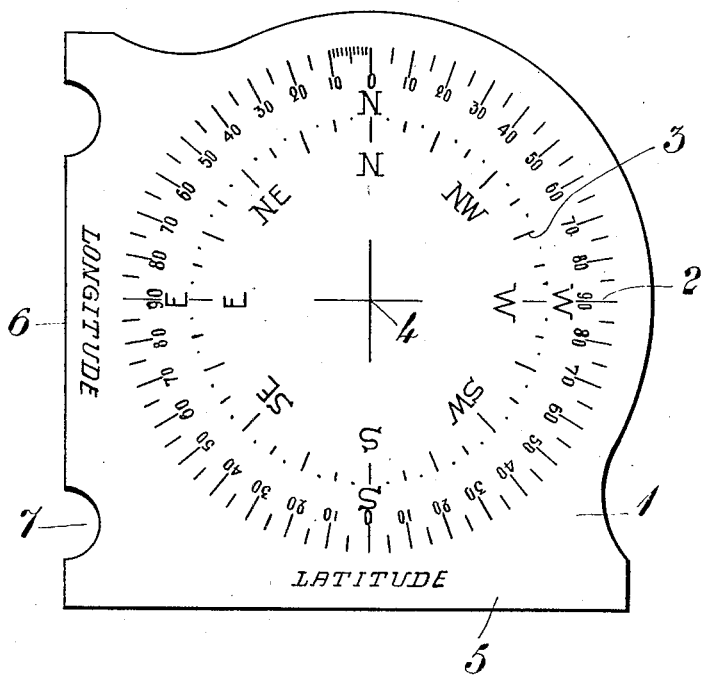

H. BRYNGE AND H. HAMMAR.
APPARATUS FOR LAYING OFF OR ASCERTAINING SHIPS' COURSES.
APPLICATION FILED AUG. 28, 1917.

1,330,839.

Patented Feb. 17, 1920.
2 SHEETS—SHEET 1.

Inventors:
Hannes Brynge & Harry Hammar
per
H. W. Plucker
Attorney.

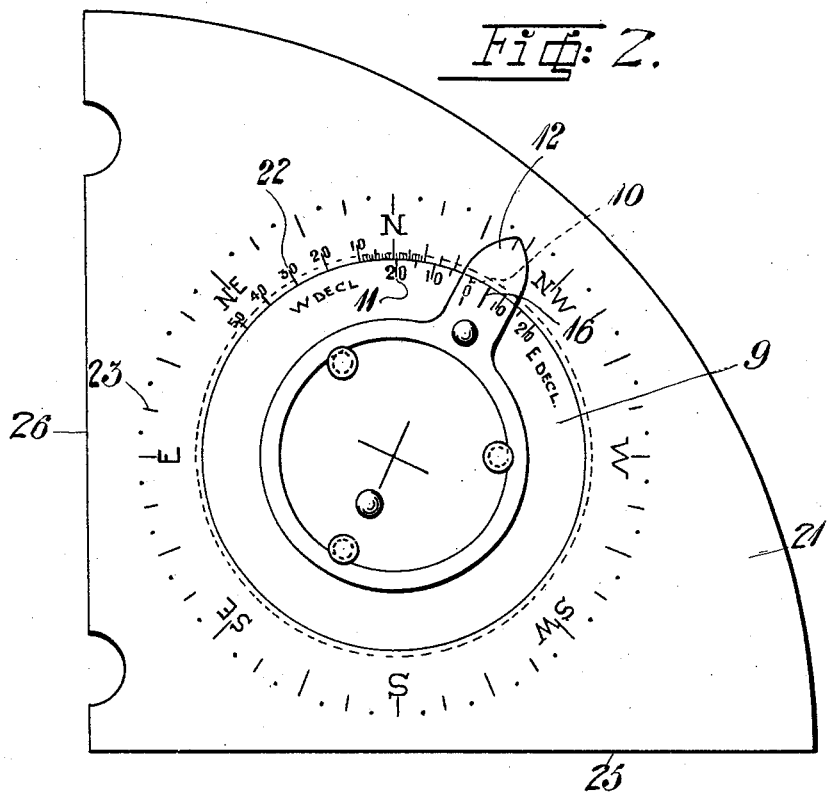
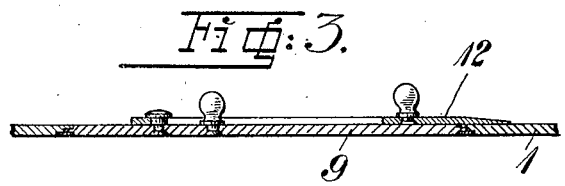

UNITED STATES PATENT OFFICE.

HANNES BRYNGE, OF ENKÖPING, AND HARRY HAMMAR, OF STOCKHOLM, SWEDEN.

APPARATUS FOR LAYING OFF OR ASCERTAINING SHIPS' COURSES.

1,330,839.  Specification of Letters Patent.  Patented Feb. 17, 1920.

Application filed August 28, 1917. Serial No. 188,687.

*To all whom it may concern:*

Be it known that we, HANNES BRYNGE and HARRY HAMMAR, subjects of the King of Sweden, residing the former at Enköping, Sweden, and the latter at Stockholm, Sweden, have invented new and useful Improvements in Apparatus for Laying Off or Ascertaining Ships' Courses, of which the following is a specification.

The present invention relates to navigating instruments and more particularly to devices for laying off the course of a ship.

The objects of our invention are to produce a device which is itself simple and inexpensive and at the same time accurate and trustworthy, and by means of which the true course may be determined with a minimum of calculation.

In the accompanying drawing our invention is illustrated, Figure 1 presenting one form, and Figs. 2 and 3 a modification thereof in plan view and cross section respectively.

The construction according to Fig. 1 consists of a transparent plate 1, provided with two straight edges 5, 6, perpendicular to each other, and on this plate is printed or engraved a circular scale of degrees 2 and a circular scale of points 3, arranged in such a manner that the quarters of wind are reversed. In the construction illustrated in Fig. 1 each of the straight edges 5, 6 is parallel with a line passing through opposite cardinal points and one of the edges is provided with notches 7 to distinguish it from the other. The center 4 of the circular scales is indicated in a suitable manner, for instance, by means of two lines, perpendicular to each other. That ruler-edge 5, which is parallel to the line joining cardinal points E—W, may appropriately be provided with the word "Latitude," while the other edge 6 is marked "Longitude," the significance of these terms being apparent from the method of use hereinafter described.

On the nautical chart a ruler is laid along the course line, which is to be determined, and then the one ruler-edge—for instance 5—of the apparatus is brought into contact with the ruler and moved along the same until the center 4 falls above a latitude. The course is then directly read off on the apparatus at the place where the latitude on the chart crosses the scale 2 on the plate 1. If the other ruler-edge 6 is used, the course is to be read off by means of a longitude. Should the apparatus be used only for a certain place it might sometimes be suitable to arrange the scale or scales in such an angle or relation to the ruler-edge or -edges that the course obtained at once will be corrected for the declination.

In the construction as illustrated in Figs. 2 and 3 a movable pointer is provided and also a circular plate concentric to the scale, the pointer being provided with indicating lines and the circular plate with a scale to indicate declination.

Such a construction is illustrated in Figs. 2 and 3, wherein 9 is the pivotally mounted, transparent pointer-plate with the indicating line 10, the zero line on the scale and the declination-scale 11 at both sides of the line 10. A second transparent pointer 12 is pivotally arranged on the pointer-plate 9 in such a manner that it passes over the scale 11 and projects to the scales 22, 23, on the transparent plate 21, When by this apparatus the course is read off, in the manner described in connection with the embodiment of Fig. 1, the circular plate 9 is turned in such a manner that the indicating line 10 coincides with the latitude or the longitude. Then the apparatus may be removed from the chart and the pointer 12 be turned to indicate the declination on the declination scale 11, for which reason the pointer 12 also is provided with an indicating line 16. The true course hereafter is to be read off on the scales 22 or 23 by means of the pointer 12. Correction for deviation may be done either simultaneously with that for the declination or afterward. Thus in Figs. 2 and 3 the true course can be obtained after the course is read off on the chart.

Common for all the apparatus according to the present invention is that the circular scale or scales are arranged at the same plate, which is provided with the ruler-edge or -edges, so that it will not be possible for the scale to turn in relation to the ruler-edge or -edges, thus preventing all mistakes by reading off the apparatus.

Having now particularly described the nature of our invention and the manner of its operation, what we claim is:

1. A navigating instrument consisting of an integral transparent plate having a straight ruler edge, said plate having an inverted compass scale marked thereon, the positions of the signs "East" and "West"

being reversed with respect to the north-south line—the line joining cardinal points of said scale being parallel to the said ruler edge of the plate, and a center mark at the center of the scale.

2. A navigating instrument consisting of an integral transparent plate having two perpendicular straight edges, said plate having an inverted compass scale marked thereon—the positions of the signs "East" and "West" being reversed with respect to the north-south line—the lines joining opposite cardinal points of said scale being parallel to the straight edges of the plate, and a center mark at the center of the scale.

3. A navigation instrument comprising a transparent plate having two perpendicular straight edges, an inverted compass scale on said plate, the lines joining opposite cardinal points of said scale being parallel to the straight edges of the plate, a center mark at the center of the scale, a circular plate concentric with said scale and movable about the center thereof, said circular plate being provided with a zero point and degree marks, and a pointer superposed thereon and movable about the center of the scale independently of both of said plates.

In testimony whereof we have signed our names to this specification in the presence of two subscribing witnesses.

HANNES BRYNGE.
HARRY HAMMAR.

Witnesses:
 H. W. HARRIS,
 JACOB BAGGE.